(12) United States Patent
Myung et al.

(10) Patent No.: US 7,857,447 B2
(45) Date of Patent: *Dec. 28, 2010

(54) INTERPENETRATING POLYMER NETWORK HYDROGEL CONTACT LENSES

(75) Inventors: David Myung, Mountain View, CA (US); Jaan Noolandl, Palo Alto, CA (US); Christopher Ta, Saratoga, CA (US); Curtis W. Frank, Cupertino, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/636,114

(22) Filed: Dec. 7, 2006

(65) Prior Publication Data

US 2007/0126982 A1 Jun. 7, 2007

Related U.S. Application Data

(63) Continuation-in-part of application No. 11/243,952, filed on Oct. 4, 2005, and a continuation-in-part of application No. 11/409,218, filed on Apr. 20, 2006, now abandoned.

(60) Provisional application No. 60/843,942, filed on Sep. 11, 2006, provisional application No. 60/783,307, filed on Mar. 17, 2006, provisional application No. 60/616,262, filed on Oct. 5, 2004, provisional application No. 60/673,172, filed on Apr. 20, 2005, provisional application No. 60/673,600, filed on Apr. 21, 2005, provisional application No. 60/616,262, filed on Oct. 5, 2004, provisional application No. 60/673,172, filed on Apr. 20, 2005.

(51) Int. Cl.
*G02H 7/04* (2006.01)

(52) U.S. Cl. .............. 351/160 H; 623/6.56; 623/5.16; 424/427; 523/106

(58) Field of Classification Search ............... 623/5.16, 623/6.56; 424/427; 351/160 H; 525/903; 523/106

See application file for complete search history.

(56) References Cited

U.S. PATENT DOCUMENTS 4,678,468 A * 7/1987 Hiroyoshi ................ 623/1.49

(Continued)

FOREIGN PATENT DOCUMENTS

WO WO 94/01468 A1 * 1/1994

(Continued)

OTHER PUBLICATIONS

European search report for European Application No. 05807352.9 dated Mar. 30, 2010.*

(Continued)

*Primary Examiner*—Paul Prebilic
(74) *Attorney, Agent, or Firm*—Lumen Patent Firm (57) ABSTRACT

The present invention provides interpenetrating polymer network hydrogels that have high oxygen permeability, strength, water content, and resistance to protein adsorption. The hydrogels include two interpenetrating polymer networks. The first polymer network is based on a hydrophilic telechelic macromonomer. The second polymer network is based on a hydrophilic monomer. The hydrophilic monomer is polymerized and cross-linked to form the second polymer network in the presence of the first polymer network. The telechelic macromonomer preferably has a molecular weight of between about 575 Da and about 20,000 Da. Mixtures of molecular weights may also be used. In a preferred embodiment, the hydrophilic telechelic macromonomer is PEG-diacrylate or PEG-dimethacrylate and the hydrophilic monomer is an acrylic-based monomer. The material is designed to serve as a contact lens.

31 Claims, 11 Drawing Sheets

U.S. PATENT DOCUMENTS

| | | | | |
|---|---|---|---|---|
| 4,680,336 A | * | 7/1987 | Larsen et al. | 524/548 |
| 4,693,715 A | * | 9/1987 | Abel, Jr. | 623/5.15 |
| 4,931,287 A | * | 6/1990 | Bae et al. | 424/484 |
| 4,973,493 A | * | 11/1990 | Guire | 427/2.24 |
| 4,978,352 A | * | 12/1990 | Fedorov et al. | 606/166 |
| 5,030,230 A | * | 7/1991 | White | 623/5.14 |
| 5,067,961 A | * | 11/1991 | Kelman et al. | 623/5.16 |
| 5,112,350 A | * | 5/1992 | Civerchia et al. | 606/107 |
| 5,115,056 A | * | 5/1992 | Mueller et al. | 526/243 |
| 5,171,318 A | * | 12/1992 | Gibson et al. | 623/5.16 |
| 5,374,515 A | * | 12/1994 | Parenteau et al. | 435/1.1 |
| 5,580,929 A | | 12/1996 | Tanaka | |
| 5,644,049 A | * | 7/1997 | Giusti et al. | 536/53 |
| 5,674,942 A | * | 10/1997 | Hill et al. | 525/131 |
| 5,716,633 A | * | 2/1998 | Civerchia | 424/428 |
| 5,770,669 A | | 6/1998 | Robertson et al. | |
| 5,836,313 A | * | 11/1998 | Perez et al. | 128/898 |
| 5,904,927 A | * | 5/1999 | Amiji | 424/422 |
| 5,962,005 A | * | 10/1999 | Saga et al. | 424/424 |
| 5,976,648 A | | 11/1999 | Li | |
| 6,005,160 A | * | 12/1999 | Hsiue et al. | 427/2.24 |
| 6,160,084 A | * | 12/2000 | Langer et al. | 528/272 |
| 6,224,893 B1 | * | 5/2001 | Langer et al. | 424/423 |
| 6,254,637 B1 | * | 7/2001 | Lee et al. | 623/5.14 |
| 6,372,815 B1 | * | 4/2002 | Sulc et al. | 523/106 |
| 6,388,043 B1 | * | 5/2002 | Langer et al. | 528/80 |
| 6,391,055 B1 | * | 5/2002 | Ikada et al. | 623/5.14 |
| 6,645,715 B1 | * | 11/2003 | Griffith et al. | 435/1.1 |
| 6,673,112 B2 | * | 1/2004 | Nigam | 623/5.15 |
| 6,689,165 B2 | * | 2/2004 | Jacob et al. | 623/5.16 |
| 6,726,322 B2 | * | 4/2004 | Andino et al. | 351/160 R |
| 6,866,936 B2 | * | 3/2005 | Opolski | 428/413 |
| RE38,839 E | | 10/2005 | Magnante | |
| 7,049,351 B2 | * | 5/2006 | Phelan et al. | 523/108 |
| 7,279,507 B2 | * | 10/2007 | Hu et al. | 523/108 |
| 2002/0007217 A1 | * | 1/2002 | Jacob et al. | 623/5.16 |
| 2002/0198280 A1 | * | 12/2002 | Baba et al. | 522/99 |
| 2004/0049268 A1 | * | 3/2004 | Noolandi et al. | 623/5.14 |
| 2004/0138382 A1 | | 7/2004 | Dous | |
| 2004/0214914 A1 | * | 10/2004 | Marmo | 523/106 |
| 2005/0147685 A1 | * | 7/2005 | Osada et al. | 424/487 |
| 2005/0148682 A1 | * | 7/2005 | Hu et al. | 523/106 |
| 2006/0008506 A1 | | 1/2006 | Cipriano De Sousa et al. | |
| 2007/0005140 A1 | * | 1/2007 | Kim et al. | 623/17.16 |
| 2007/0068816 A1 | * | 3/2007 | Solomon et al. | 204/606 |
| 2008/0119930 A1 | * | 5/2008 | Osada et al. | 623/14.12 |
| 2008/0317818 A1 | * | 12/2008 | Griffith et al. | 424/427 |

FOREIGN PATENT DOCUMENTS

| | | | |
|---|---|---|---|
| WO | WO 00/02937 A1 | * | 1/2000 |
| WO | WO 03/093337 A1 | * | 4/2003 |
| WO | WO 2004/055057 A1 | * | 7/2004 |

OTHER PUBLICATIONS

Gong et al. "Double-Network Hydrogels with Extremely High Mechanical Strength" (2003) Adv. Materials No. 14 pp. 1155-1158.

Cruise, G.M., D.S. Scharp and J.A. Hubbell, Characterization of permeability and network structure of interfacially photopolymerized poly(ethylene glycol) diacrylate hydrogels. Biomaterials, 1998. 19(14): p. 1287-94.

Padmavathi, N.C. and P.R. Chatterji, Structural characterization and swelling behavior of poly(ethylene glycol) diacrylate hydrogels. Macromolecules, 1996. 29: p. 1976-1979.

Merrett, K., C.M. Griffith, Y. Deslandes, G. Pleizier, and H. Sheardown, Adhesion of corneal epithelial cells to cell adhesion peptide modified pHEMA surfaces. J Biomater Sci Polym Ed, 2001. 12(6): p. 647-71.

Houseman, B.T. and M. Mrksich, The microenvironment of immobilized Arg-Gly-Asp peptides is an important determinant of cell adhesion. Biomaterials, 2001. 22(9): p. 943-55.

Hern, D.L. and J.A. Hubbell, Incorporation of adhesion peptides into nonadhesive hydrogels useful for tissue resurfacing. J Biomed Mater Res, 1998. 39(2): p. 266-76.

Matsuda, T., K. Inoue and T. Sugawara, Development of micropatterning technology for cultured cells. ASAIO Transactions, 1990. 36(3): p. M559-62.

Tsuk, A.G., V. Trinkaus-Randall and H.M. Leibowitz, Advances in polyvinyl alcohol hydrogel keratoprostheses: protection against ultraviolet light and fabrication by a molding process. Journal of Biomedical Materials Research, 1997. 34(3): p. 299-304.

Saito, Hidenao et al. "Preparation and Properties of Transparent Cellulose Hydrogels" (2003) Journal of Applied Polymer Science, vol. 90 pp. 3020-3025.

Benjamin, et al. "Oxygen Permeability (Dk) of Thirty-Seven Rigid Contact Lens Materials" (2002) Optometry and Vision Science, vol. 79, No. 2 pp. 103-111.

Carlsson, D.J., F. Li, S. Shimmura, and M. Griffith, Bioengineered corneas: how close are we? Curr Opin Ophthalmol, 2003. 14(4): p. 192-7.

Evans, M.D., G.A. McFarland, R.Z. Xie, S. Taylor, J.S. Wilkie, and H. Chaouk, The use of corneal organ culture in biocompatibility studies. Biomaterials, 2002. 23(5): p. 1359-67.

Mann, B.K., A.S. Gobin, A.T. Tsai, R.H. Schmedlen, and J.L. West, Smooth muscle cell growth in photopolymerized hydrogels with cell adhesive and proteolytically degradable domains: synthetic ECM analogs for tissue engineering. Biomaterials, 2001. 22: p. 3045-3051.

Gong et al. Double-Network Hydrogels with Extremely High Mechanical Strength. Adv. Materials 15(14) 1155-1158, 2003.

Hern et al. Incorporation of adhesion peptides into nonadhesive hydrogels useful for tissue resurfacing. J. Biomed. Materials Research 39(1) 266-276, 1998.

Evans et al. The use of corneal organ culture in biocompatibility studies. Biomaterials 23 1359-1367, 2002.

* cited by examiner

INTERPENETRATING POLYMER NETWORK HYDROGEL CONTACT LENSES

CROSS-REFERENCE TO RELATED APPLICATIONS

This application claims priority from U.S. Provisional Application Nos. 60/843,942, filed on Sep. 11, 2006, and 60/783,307, filed Mar. 17, 2006, both of which are incorporated herein by reference. This application is a continuation-in part of U.S. patent application Ser. No. 11/243,952, filed Oct. 4, 2005, which claims priority from U.S. Provisional Patent Application No. 60/616,262, filed Oct. 5, 2004, and from U.S. Provisional Patent Application No. 60/673,172, filed Apr. 20, 2005, all of which are incorporated by reference herein. This application is also a continuation-in-part of U.S. application Ser. No. 11/409,218, filed Apr. 20, 2006, now abandoned which claims priority from U.S. Provisional Patent Application No. 60/673,600, filed Apr. 21, 2005, both of which are incorporated by reference herein. U.S. application Ser. No. 11/409,218 is a continuation-in-part of U.S. patent application Ser. No. 11/243,952, filed Oct. 4, 2005, which claims priority from U.S. Provisional Patent Application No. 60/616,262, filed Oct. 5, 2004, and from U.S. Provisional Patent Application No. 60/673, 172, filed Apr. 20, 2005, all of which are incorporated by reference herein.

FIELD OF THE INVENTION

The present invention relates generally to vision correction. More particularly, the present invention relates to an interpenetrating network hydrogel useful as a contact lens material.

BACKGROUND

Current contact lenses have several disadvantages, including contact lens intolerance, immune reactions to the contact lenses themselves or to the protein bound to the lenses, and infections associated with contact lens use. To overcome these disadvantages, an ideal contact lens would have high water content, oxygen permeability, mechanical strength and resistance to protein adsorption. However, current contact lenses only have a subset of these properties. For example, silicone-based contact lenses offer high oxygen permeability and strength, but have a relatively high level of protein adsorption due to their hydrophobicity. Hydrophilic components such as poly(2-hydroxyethylmethacrylate) (PHEMA), poly(methacrylic acid) (PMAA), and poly(vinyl alcohol) (PVA) are often incorporated into contact lenses to increase water content and wettability. However, protein adsorption continues to be a problem with contact lenses based on these materials. Accordingly, there is a need in the art to develop materials for contact lenses that have high water content, oxygen permeability, mechanical strength and resistance to protein adsorption.

SUMMARY OF THE INVENTION

The present invention provides interpenetrating polymer network hydrogels that have high oxygen permeability, strength, water content, and resistance to protein adsorption. The hydrogels include two interpenetrating polymer networks. The first polymer network is based on a hydrophilic telechelic macromonomer. The second polymer network is based on a hydrophilic monomer. The hydrophilic monomer is polymerized and cross-linked to form the second polymer network in the presence of the first polymer network. Preferably, the first polymer contains at least about 50% by dry weight of telechelic macromonomer, more preferably at least about 75% by dry weight of telechelic macromonomer, and most preferably at least about 95% by dry weight of telechelic macromonomer. The telechelic macromonomer preferably has a molecular weight of between about 575 Da and about 20,000 Da. Mixtures of molecular weights may also be used.

In a preferred embodiment, the telechelic macromonomer is poly(ethylene) glycol (PEG) diacrylate or poly(ethylene) glycol (PEG) dimethacrylate. Also preferably, the hydrophilic monomer is acrylic acid, acrylamide, hydroxyethyl acrylamide, N-isopropylacrylamide, methacrylic acid, 2-acrylamido-2-methylpropanesulfonic acid, 2-hydroxyethyl methacrylate, 2-hydroxyethyl acrylate or derivatives thereof.

In one embodiment, at least one surface of the interpenetrating polymer network hydrogel is surface modified. Preferably, at least one surface is modified with a layer of poly (ethylene) glycol (PEG) macromonomers, polymerized PEG macromonomers, polymerized PEG diacrylate, or polymerized PEG dimethacrylate.

In another embodiment, the interpenetrating polymer network hydrogel includes grafted polymers. For example, a hydrophilic monomer may be grafted onto the first polymer network, a telechelic macromonomer may be grafted onto the second polymer network, or both.

The interpenetrating polymer network hydrogels of the present invention have a number of desirable properties. These properties include high tensile strength (on the order of 1 MPa), high oxygen permeability (at least about 15 Barrers, preferably at least about 90 Barrers), high water content (between about 70% and about 95%), and high transparency (at least about 70%). These properties make the interpenetrating polymer network hydrogels excellent for use in ophthalmic applications. In a preferred embodiment, the interpenetrating network hydrogel is used in a contact lens.

BRIEF DESCRIPTION OF THE FIGURES

The present invention together with its objectives and advantages will be understood by reading the following description in conjunction with the drawings, in which.

DETAILED DESCRIPTION OF THE INVENTION

Synthesis of Interpenetrating Network Hydrogels

The present invention provides interpenetrating polymer network (IPN) hydrogels. The new hydrogels have properties making them desirable as biomaterials for use, e.g., in ophthalmic applications. The hydrogels are particularly well suited as a material for contact lenses.

FIG. 1 shows the steps required for synthesis of an IPN hydrogel according to the present invention. The starting material for the hydrogel is a solution of telechelic macromonomers 110 with functional end groups 112. The telechelic macromonomers are polymerized to form a first polymer network 120. Next, hydrophilic monomers 130 are added to the first polymer network 120. Hydrophilic monomers 130 are then polymerized and cross-linked in the presence of first polymer network 130 to form second polymer network 140. This results in formation of an IPN hydrogel 150.

Any hydrophilic telechelic macromonomer may be used to form the first polymer network. In a preferred embodiment, polymer polyethylene glycol (PEG) macromonomers are used as the basis of the first network. PEG is known to be biocompatible, soluble in aqueous solution, and can be synthesized to give a wide range of molecular weights and chemical structures. The hydroxyl end-groups of the bifunctional glycol can be modified into photo-crosslinkable acrylate or methacrylate end-groups, converting the PEG macromonomers to PEG-diacrylate (PEG-DA) or PEG-dimethacrylate (PEG-DMA) macromonomers. Adding a photoinitiator to a solution of PEG-diacrylate or PEG-dimethacrylate macromonomers in water and exposing the solution to UV light results in the crosslinking of the PEG-DA or PEG-DMA macromonomers, giving rise to a PEG-DA or PEG-DMA hydrogel. Polymerizing and crosslinking a second network inside the first network will give rise to the IPN structure. Preparing IPN hydrogels through free-radical polymerization has the additional advantage that it will enable the use of molds to form contact lenses of desired shape. The free-radical polymerization can be initiated through UV irradiation—in which case transparent molds can be used—or through other means such as thermal-initiation in which non-transparent molds can be used. Preferably, the first polymer network contains at least 50%, more preferably at least 75%, most preferably at least 95% of the telechelic macromonomer by dry weight.

Any hydrophilic monomer may be used to form the second polymer network according to the present invention. To optimize mechanical and other properties of the IPN hydrogel, a variety of acrylic based monomers may be used, such as acrylic acid, acrylamide, hydroxyethyl acrylamide, N-isopropylacrylamide, methacrylic acid, 2-acrylamido-2-methylpropanesulfonic acid, 2-hydroxyethyl methacrylate, 2-hydroxyethyl acrylate or derivatives thereof. In a preferred embodiment, poly(acrylic acid) (PAA) hydrogel is used as the second polymer network.

In a preferred embodiment, the IPN hydrogel is synthesized by a (two-step) sequential network formation technique based on UV initiated free radical polymerization. A precursor solution for the first network is made of purified PEG-DA or PEG-DMA dissolved in phosphate buffered saline (PBS) solution with, e.g., 2,2-dimethoxy-2-phenylacetophenone (DMPA) or 2-hydroxy-2-methyl-propiophenone as the UV sensitive free radical initiator. In other embodiments, the hydrogel can be synthesized by free radical polymerization initiated by other means, such as thermal-initiation and other chemistries not involving the use of ultraviolet light. In the case of UV polymerization, the precursor solution is cast in a transparent mold and reacted under a UV light source at room temperature. Upon exposure, the precursor solution undergoes a free-radical induced gelation and becomes insoluble in water. The mold is fabricated in such a way that yields hydrogels at equilibrium swelling with dimensions typical of contact lenses: between 13.00 and 14.50 mm in diameter and center thickness ~30 microns.

To incorporate the second network, the PEG-based hydrogels are removed from the mold and immersed in the second monomer solution, such as an aqueous solution of (10-100% v/v) acrylic acid containing a photo-initiator and a cross-linker, such as about 0.1 to about 10% triethylene glycol dimethacrylate (TEGDMA), for 24 hours at room temperature. Other cross-linkers may be used, e.g. ethylene glycol dimethacrylate, ethylene glycol diacrylate, polyethylene glycol dimethacrylate, or polyethylene glycol diacrylate. The swollen gel is then exposed to the UV source and the second network is polymerized and crosslinked inside the first network to form an IPN structure. Other monomer candidates for the second network, such as acrylic acid derivatives, methacrylic acid and its derivatives, acrylamide, or 2-acrylamido-2-methylpropanesulfonic acid can be also incorporated into the PEG-based hydrogel using the same initiator, crosslinking agent and polymerization procedure. Preferably, the molar ratio of the first network macromonomer to the second network monomer ranges from about 1:1 to about 1:5000. Also preferably, the weight ratio of the first network to the second network is in the range of about 10:1 to about 1:10. All synthesized hydrogels can be stored in sterile aqueous conditions until further use.

In one embodiment of the present invention, UV light-absorbing monomers can be incorporated into the synthetic process by co-polymerization. In particular, a benzotriazole monomer (2-(2'methacryloxy-5'-methylphenyl)-benzotriazole (Polysciences, Inc., Warrington, Pa.) and a benzophenone monomer (2-hydroxy-4-acrylyloxyethoxy)-benzophenone (Cyasorb UV-2098, Cytec Industries, Inc., West Patterson, N.J.) can be used. These have been incorporated into (vinyl alcohol) hydrogels by Tsuk and coworkers (Tsuk et al. (1997) in a paper entitled "*Advances in polyvinyl alcohol hydrogel keratoprostheses: protection against ultraviolet light and fabrication by a molding process*" and published in "*J. Biomed. Mat. Res.* 34(3):299-304"). Once the UV-absorbing monomers have been incorporated into the materials, the light-absorbing capacity can be tested using a spectrophotometer. Finally, the refractive index of all candidate materials can be measured using an automated refractometer (CLR 12-70, Index Instruments, Cambridge, UK) or manually using an Abbe refractometer.

Figure 1A:
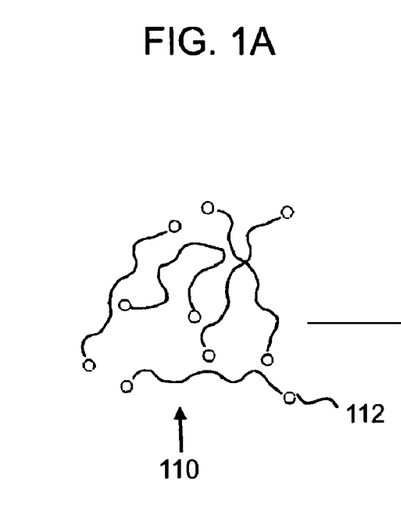
FIGS. 1A-D show the steps for synthesis of an interpenetrating polymer network hydrogel according to the present invention.
Figure 1B:
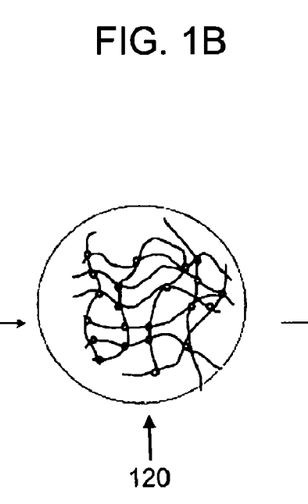
Figure 1C:
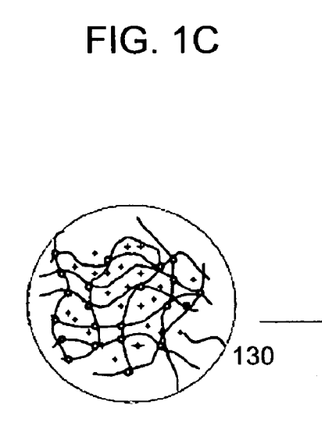
Figure 1D:
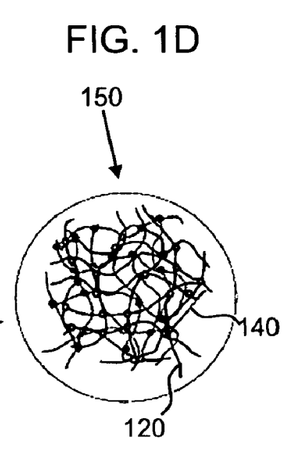
Figure 2:
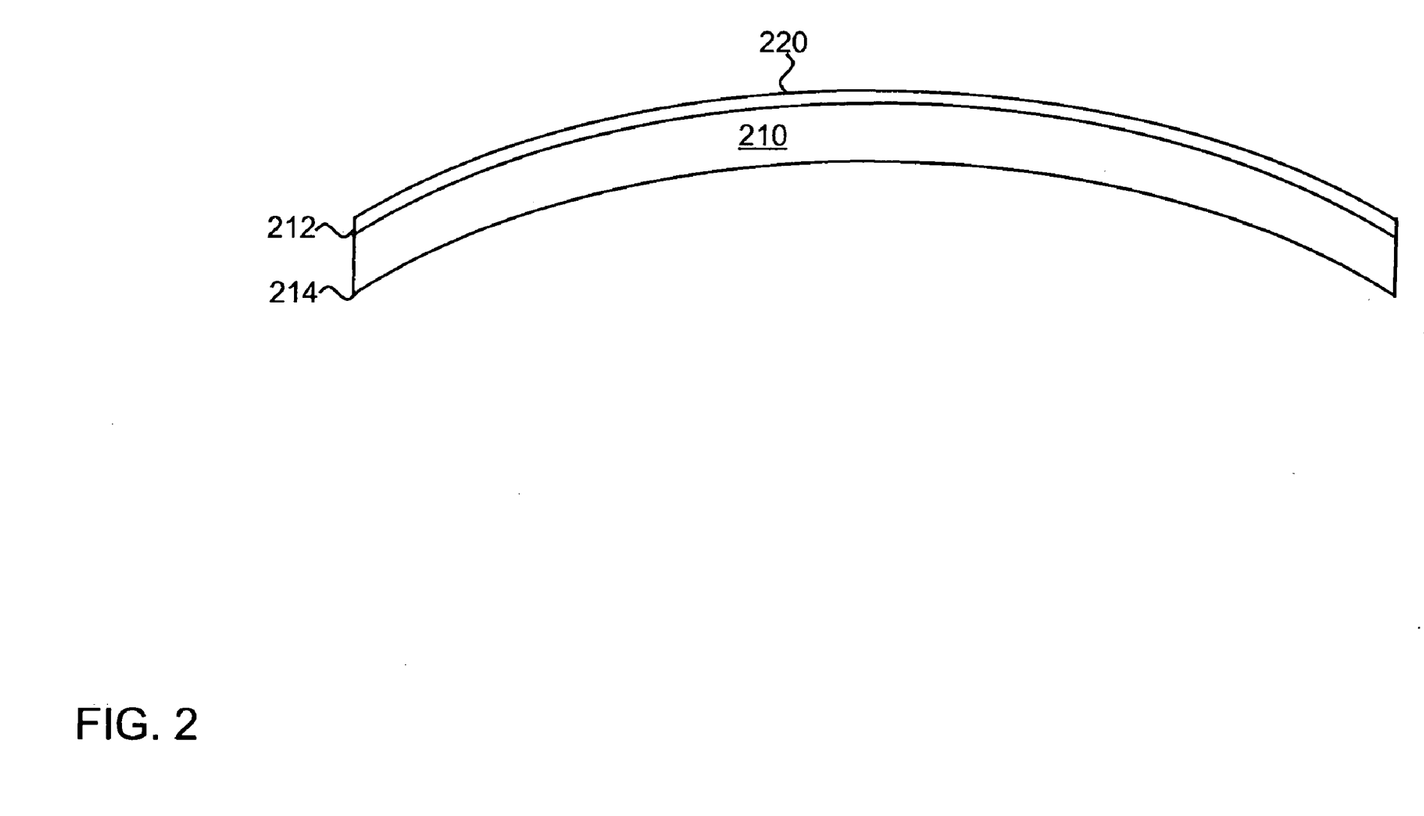
FIG. 2 shows surface modification of an interpenetrating polymer network hydrogel according to the present invention.

In one embodiment of the present invention, one or both surfaces of the IPN hydrogel (or contact lens made from the hydrogel) is surface modified, e.g. to give increased resistance to protein adsorption. In one aspect of this embodiment, one or both surfaces is modified with a layer of PEG macromonomers, polymerized PEG macromonomers, polymerized PEG-DA, polymerized PEG-DMA, polymerized PEG-acrylate or polymerized PEG-methacrylate. The layer may be bulk polymerized on the surface of the hydrogel either as an interpenetrating network or as a network covalently anchored to the surface. Alternatively, PEG chains can be covalently tethered to the surface of the hydrogel by utilizing 5-azido-2-nitrobenzoic acid N-hydroxysuccinimide ester and an amine-terminated PEG macromonomer. FIG. 2 shows a contact lens 210 with surfaces 212 and 214. In this example, surface 212 is modified with PEG macromonomer layer 220, although both or neither surface may be modified.

Figure 3:
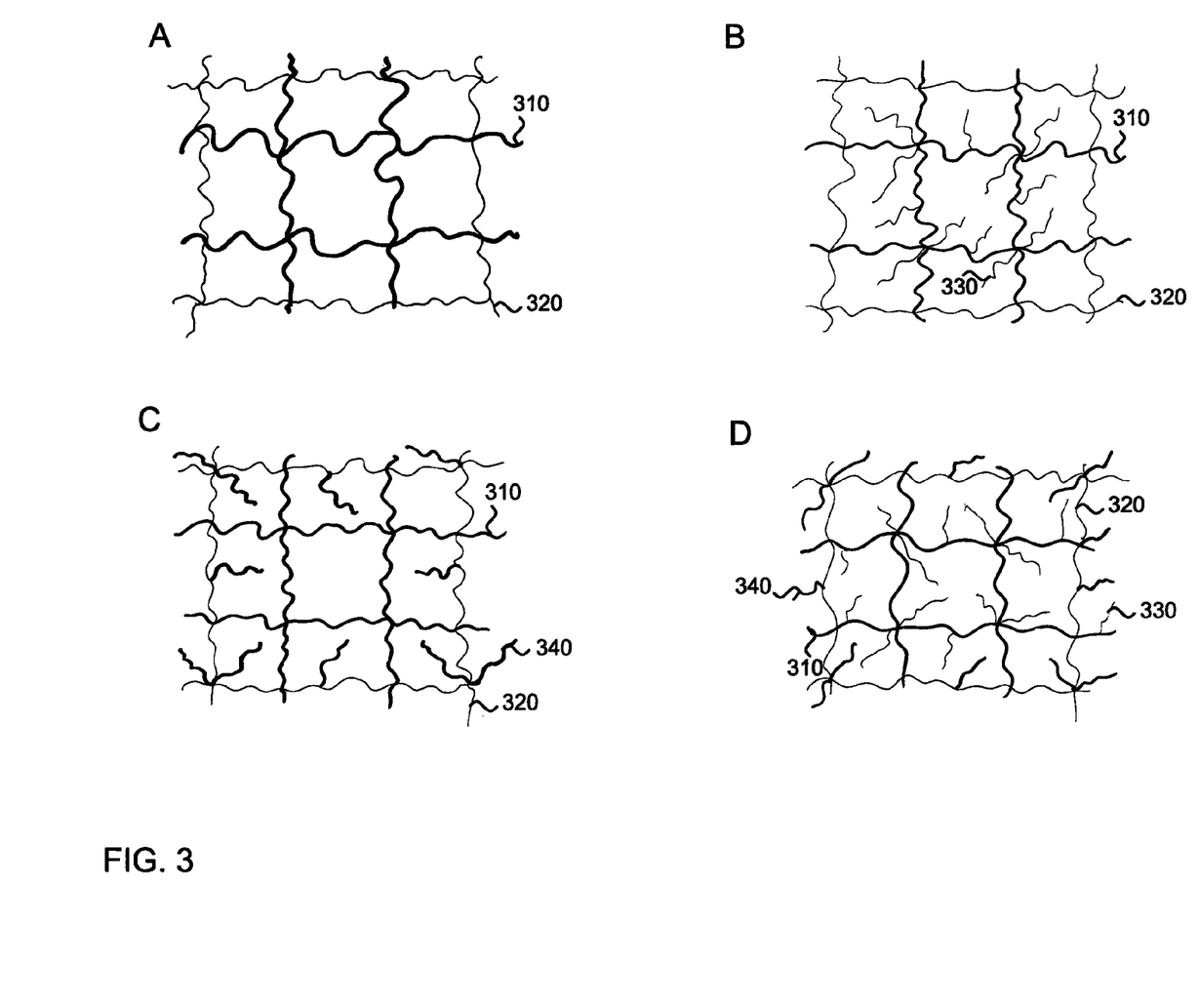
FIG. 3 shows grafted interpenetrating polymer network hydrogels according to the present invention.

In another embodiment of the present invention, grafted polymers are used to form the IPN. FIG. 3A shows a standard IPN according to the present invention, with first polymer network 310 and second polymer network 320. FIG. 3B shows an IPN in which first polymer network is grafted with hydrophilic monomer 330. Hydrophilic monomer 330 may be, e.g., acrylic acid, acrylamide, hydroxyethyl acrylamide, N-isopropylacrylamide, methacrylic acid, 2-acrylamido-2-methylpropanesulfonic acid, 2-hydroxyethyl methacrylate, 2-hydroxyethyl acrylate or derivatives thereof. FIG. 3C shows an IPN in which second polymer network 320 is grafted with hydrophilic telechelic macromonomer 340. Hydrophilic telechelic macromonomer 340 may be, e.g., PEG-DA or PEG-DMA. FIG. 3D shows an IPN in which first polymer network 310 is grafted with hydrophilic monomer 330 and second polymer network 320 is grafted with hydrophilic telechelic macromonomer 340. The grafted networks are made by polymerizing aqueous mixtures of the two components in ratios that yield a network that is predominantly made from one polymer but has grafted chains of the second polymer.

Properties of Interpenetrating Network Hydrogels

Mechanical Strength

Figure 4:
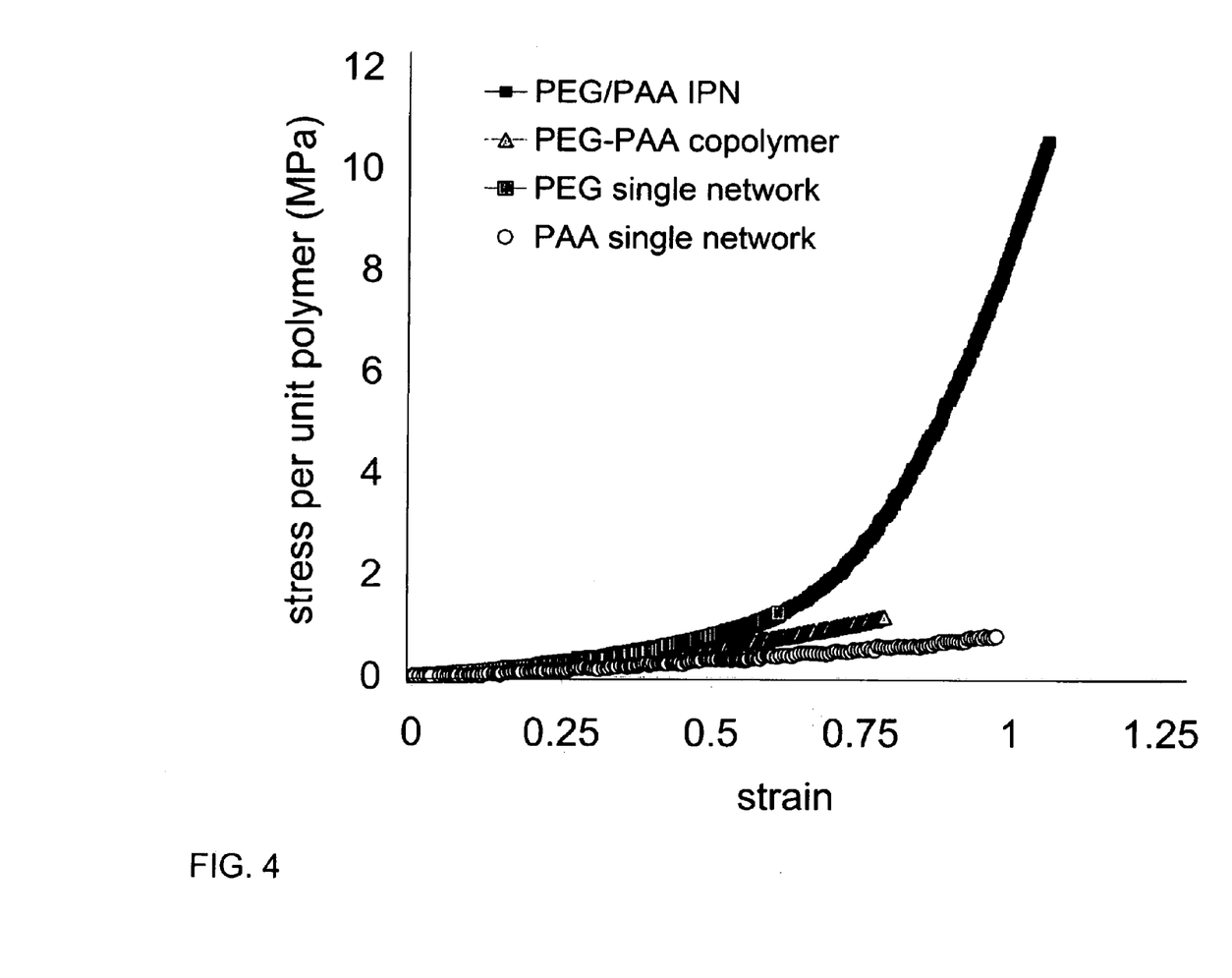
FIG. 4 shows the tensile strength of a representative interpenetrating polymer network hydrogel according to the present invention.

Our extensometry studies show that IPN hydrogels possess a number of important mechanical properties that make them excellent candidates for contact lenses. We have tested IPN hydrogels composed of PEG-DA (50% w/v in dH$_2$O) in the preparation state of the first network and polyacrylic acid (50% v/v in dH$_2$O) in the preparation state of the second network. The telechelic macromonomer PEG-DA will be referred to as simply PEG hereafter for brevity. We compared the strength of these IPN hydrogels to single networks of PEG or PAA, as well as copolymers of PEG and PAA. The samples were tested on an Instron Materials Tester and normalized for thickness as well as polymer content (based on the weight fraction of polymer in the hydrogel). The calculated true stress per unit solid (megapascals) and strain (fraction of original length) data are shown in FIG. 4. FIG. 4 shows that PEG/PAA IPNs are much stronger than either the individual polymer networks or the copolymers. The effect of IPN formation on tensile strength is non-linear, as the maximum strength is many times higher than that of a PEG-PAA copolymer.

Figure 5:
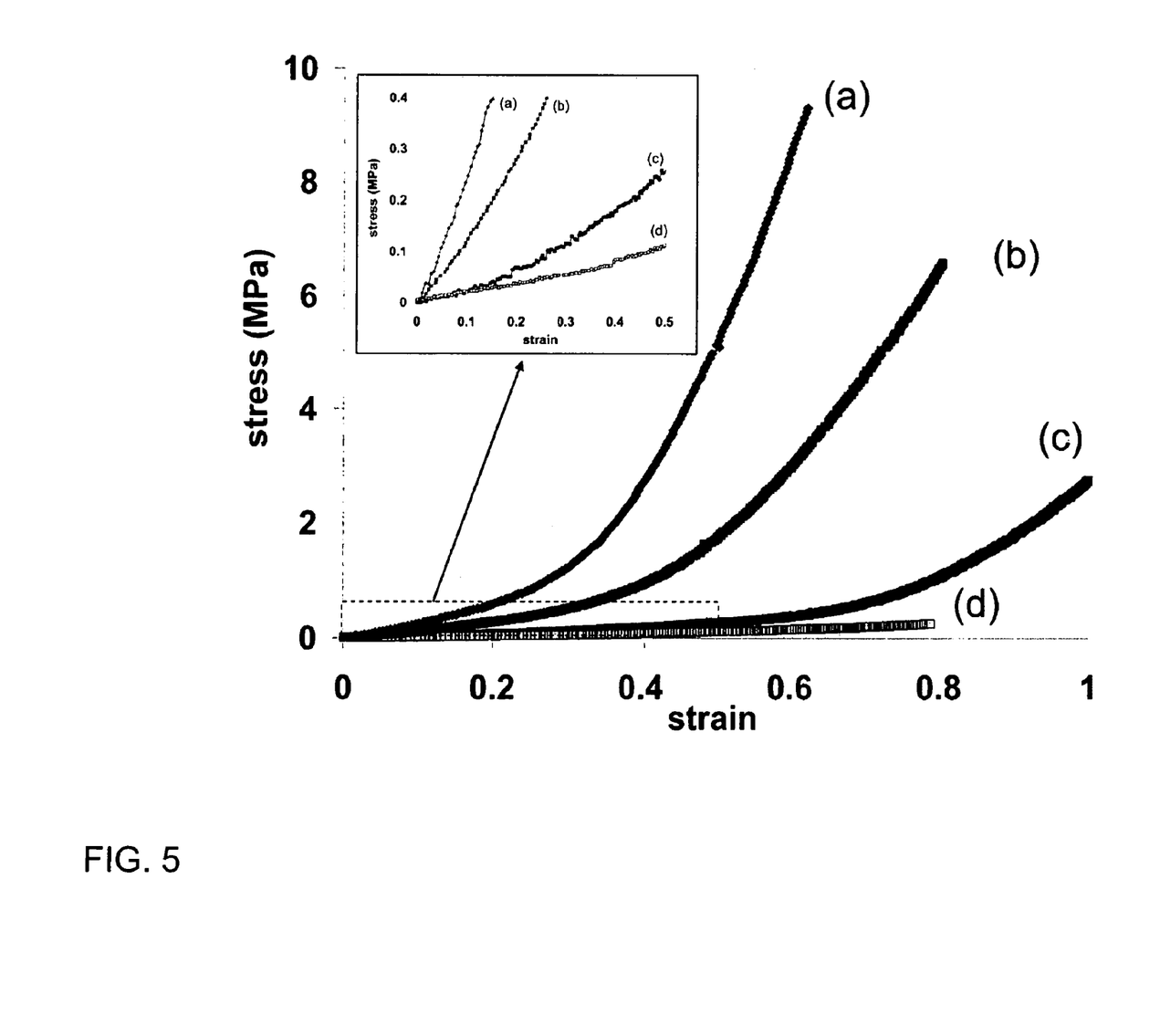
FIG. 5 shows relationship between tensile strength and PEG molecular weight for interpenetrating polymer network hydrogels according to the present invention.

The elastic moduli and tensile strength of the IPNs can be modified by changing the molecular weight of the PEG macromonomer used. For example, a range of PEG/PAA IPNs with PEG molecular weights from 575 Da to 20,000 Da have been synthesized. It was found that optically clear hydrogels may be formed from any of this range of molecular weights. However, as shown in FIG. 5, the tensile strength of the hydrogel varies depending on the MW of PEG used. FIG. 5 shows results obtained using (a) PEG(3400), (b) PEG(4600), (c) PEG(8000) and (d) PEG(14000). FIG. 5 shows that use of lower molecular weight PEG results in stronger hydrogels.

Figure 6:
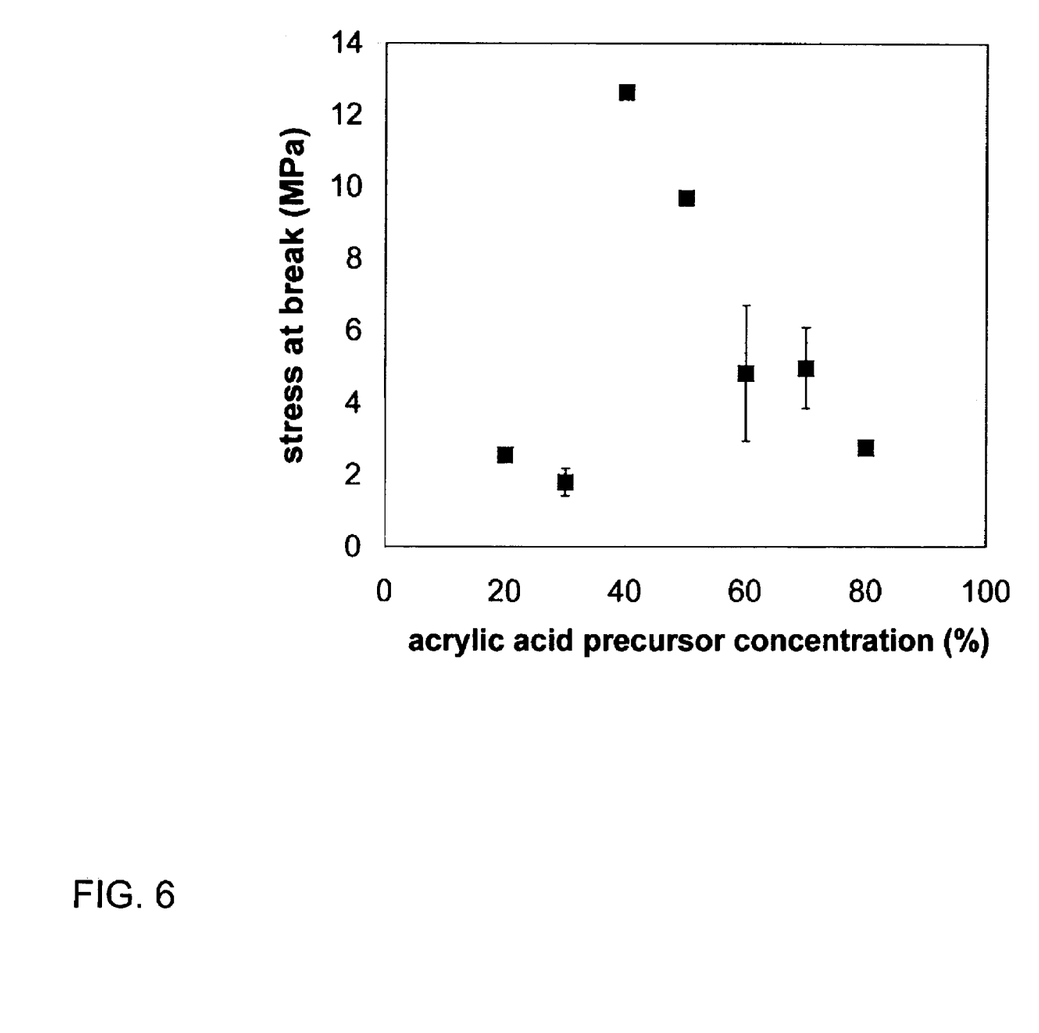
FIG. 6 shows relationship between stress-at-break and acrylic acid precursor concentration for interpenetrating polymer network hydrogels according to the present invention.
Figure 7:
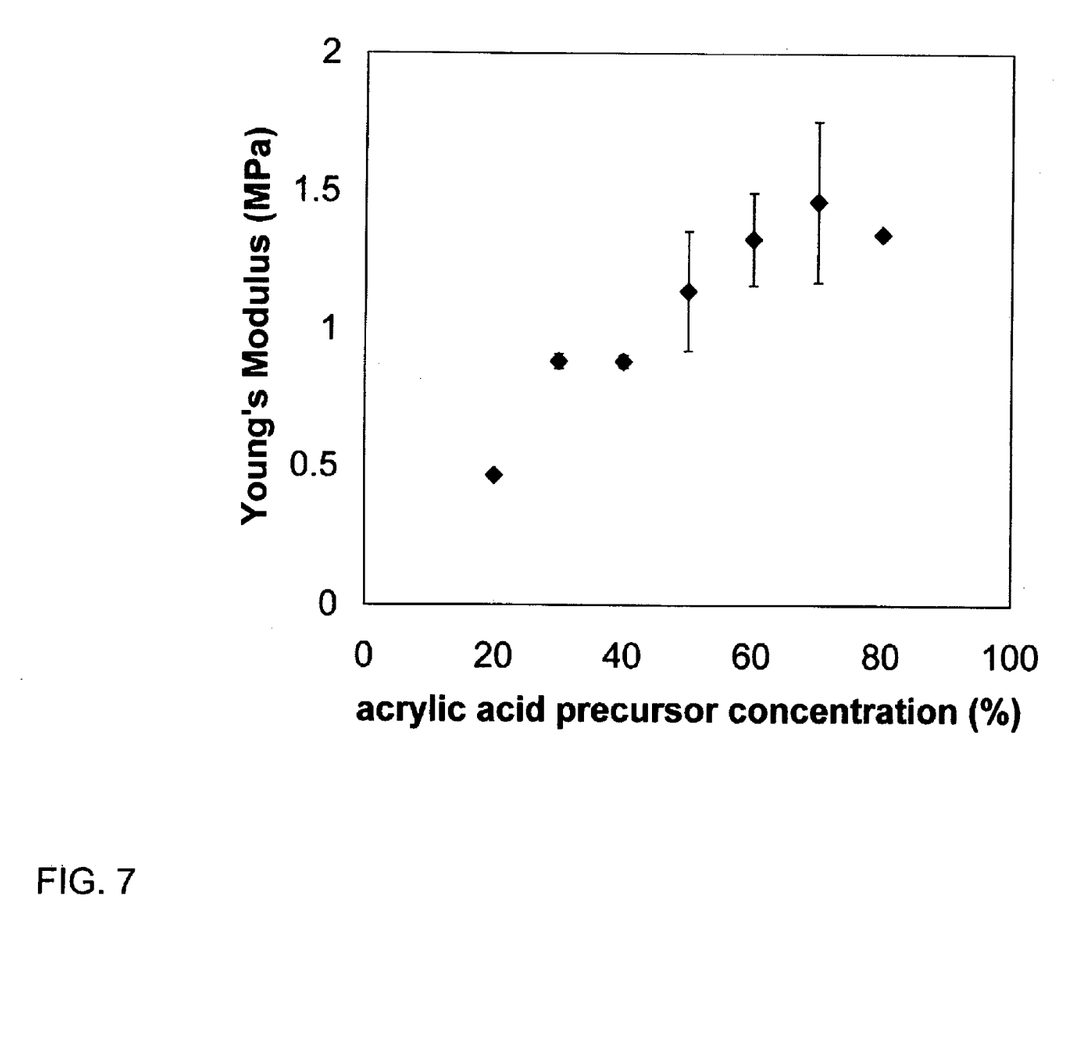
FIG. 7 shows relationship between Young's modulus and acrylic acid precursor concentration for interpenetrating polymer network hydrogels according to the present invention.

The elastic moduli and tensile strength of the IPNs can also be modified by changing the amount of acrylic acid used in the IPN. FIG. 6 shows stress-at-break values of PEG(4600)/PAA IPNs prepared from varying acrylic acid precursor solution concentrations in the preparation state of the second network. The strongest IPNs used 40% acrylic acid to prepare the second network. FIG. 7 shows Young's modulus values of PEG(4600)/PAA IPNs prepared from varying acrylic acid precursor solution concentrations in the preparation state of the second network. In general, the Young's modulus increases with increasing concentrations of acrylic acid in preparation of the second network.

A soft contact lens with ample mechanical strength is important for enabling their daily handling, cleaning, and storage. Hydrogels according to the present invention, as well as contact lenses made from these hydrogels, preferably have a tensile strength on the order of 1 MPa, more preferably at least 1 MPa, most preferably between about 1 and 5 MPa.

Oxygen Permeability

IPN hydrogels composed of a PEG first network with MW 8000 and concentration of 50% w/v in dH$_2$O in the preparation state, and a second network of polyacrylic acid with 50% v/v in dH$_2$O in the preparation state were used to test oxygen permeability. The hydrogels were first rinsed in distilled water, then soaked in phosphate buffer solution for at least 24 hrs. The harmonic thickness of the hydrogel was then measured using Electronic thickness gauge Model ET-3 (Rehder Development company). The hydrogel was then soaked again in phosphate buffered saline solution for at least 24 hrs. Next, an electrode assembly (Rehder Development company) was attached to a polarographic cell and electrical cables were attached between the electrode assembly and a potentiostat (Gamry instruments). About 1.5 L of buffer solution was then saturated with air for at least 15 minutes and preheated to 35° C. Next, the hydrogel was carefully placed onto the electrode, the gel holder was placed over the hydrogel, and a few drops of buffer solution were placed on top of the hydrogel to keep the hydrogel saturated with buffer solution. The central part of the cell was then attached onto the cell bottom and the top part of the cell, containing the stirring rod, impeller, and coupling bushing, was attached to the top part of the cell. Air saturated buffer solution at 35° C. was then poured into the assembled cell and filled almost to the top. Next, heating coiled tubing was placed around the cell, the tubing was connected to the heating bath, insulation was wrapped around and on top of the cell, and the flow of heating fluid was turned on. The speed was then set at 400 rpm and current data was collected until the steady state was reached. The speed was then reset in 100 rpm increments up to 1200 rpm, and data was again collected. This data was then used to get the oxygen permeability by plotting the inverse of steady current versus the Reynolds number to the minus ⅔. An oxygen permeability of 95.9±28.5 Barrers was obtained. Hydrogels according to the present invention, as well as contact lenses made from these hydrogels, preferably have an oxygen permeability of more than about 15 Barrers, more preferably at least about 60 Barrers, most preferably at least about 90 Barrers.

Equilibrium Water Content

The water content of the hydrogels was evaluated in terms of the swollen-weight-to-dry-weight ratio. The dry hydrogel was weighed and then immersed in water as well as phosphate buffered saline. At regular intervals, the swollen gels were lifted, patted dry, and weighed until equilibrium was attained. The percentage of equilibrium water content (WC) was calculated from the swollen and dry weights of the hydrogel:

$$WC = \frac{W_S - W_d}{W_S} \times 100$$

where $W_s$ and $W_d$ are the weights of swollen and dry hydrogel, respectively.

Figure 8:
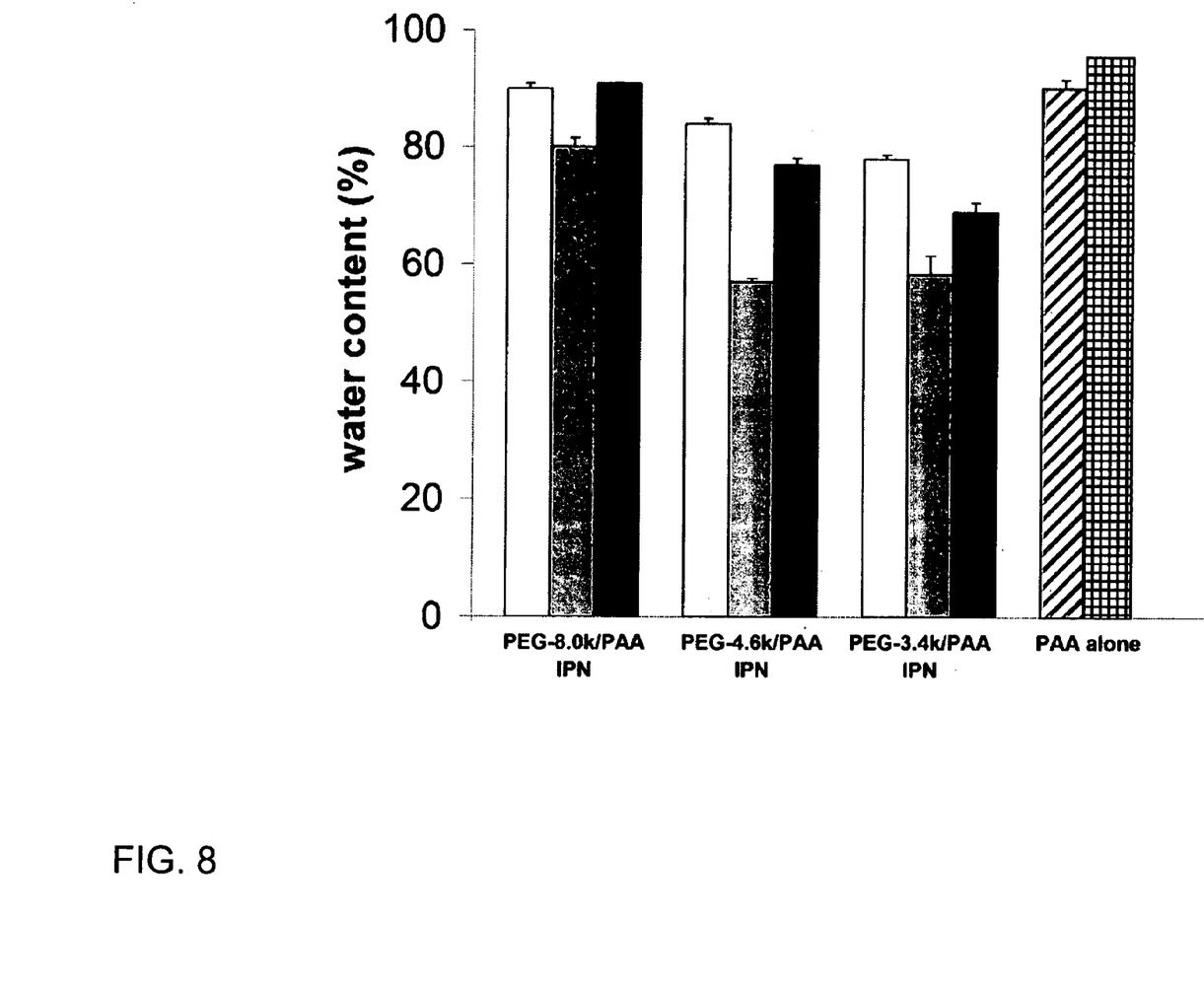
FIG. 8 shows representative equilibrium water contents for hydrogels according to the present invention.

The parameters varied to obtain hydrogels with differing water content were the molecular weight of the PEG macronomomer, the weight fraction of PAA in the second network, as well as the amount of crosslinking agent (e.g. triethylene glycol dimethacrylate, or low molecular weight PEG-DA) added to the first or second networks. FIG. 8 shows water content data for PEG networks of varying macronomomer MW (white bars), and PEG/PAA IPNs made with PEG macromonomers of varying MW in deionized water (gray bars) and in the ionizing conditions of PBS, pH 7.4 (black bars). The water content data for the PAA network alone in deionized water (gray diagonal-patterned bars) and in PBS, pH 7.4 (black square-patterned bars) is shown on the right as a basis for comparison.

Table 1 shows the effect of varying the concentration of acrylic acid monomer used to prepare the second network on the equilibrium water content of PEG/PAA IPNs. In general, lower concentrations of acrylic acid monomer leads to hydrogels with higher equilibrium water content.

TABLE 1

Equilibrium Water Content of PEG(8.0 k)/PAA hydrogels with varying preparation concentration of acrylic acid (AA) monomer

| Concentration of AA in the preparation state | Equilibrium Water Content of PEG/PAA IPN |
|---|---|
| 30% | 99% |
| 40% | 91% |
| 50% | 83% |

Hydrogels according to the present invention, as well as contact lenses made from these hydrogels, preferably have an equilibrium water content of between about 20-95%, more preferably between about 70-90% or between about 20-60%.

Because different MWs of PEG and different starting concentrations of acrylic acid result in different amounts of equilibrium water content, the final amount of PEG and PAA in the hydrogel varies depending on the MW of the starting PEG used and the concentration of acrylic acid used. Examples of compositions of varying weight ratios of PEG and PAA that have been made according to the present invention are shown in Table 2. The compositions in this table were all made using a starting concentration of 50% PEG macromonomers.

TABLE 2

Compositions of PEG(8.0 k)/PAA IPNs with varying preparation concentration of AA monomer

| Concentration of AA in the preparation state | Dry Wt. % PEG in IPN | Dry Wt. % PAA in IPN | (Dry Wt. PEG)/ (Dry Wt. PAA) |
|---|---|---|---|
| 30% | 23.5% | 76.5% | 0.30 |
| 40% | 17.5% | 82.5% | 0.20 |
| 50% | 13.0% | 87.0% | 0.15 |

Optical Clarity

Figure 9:
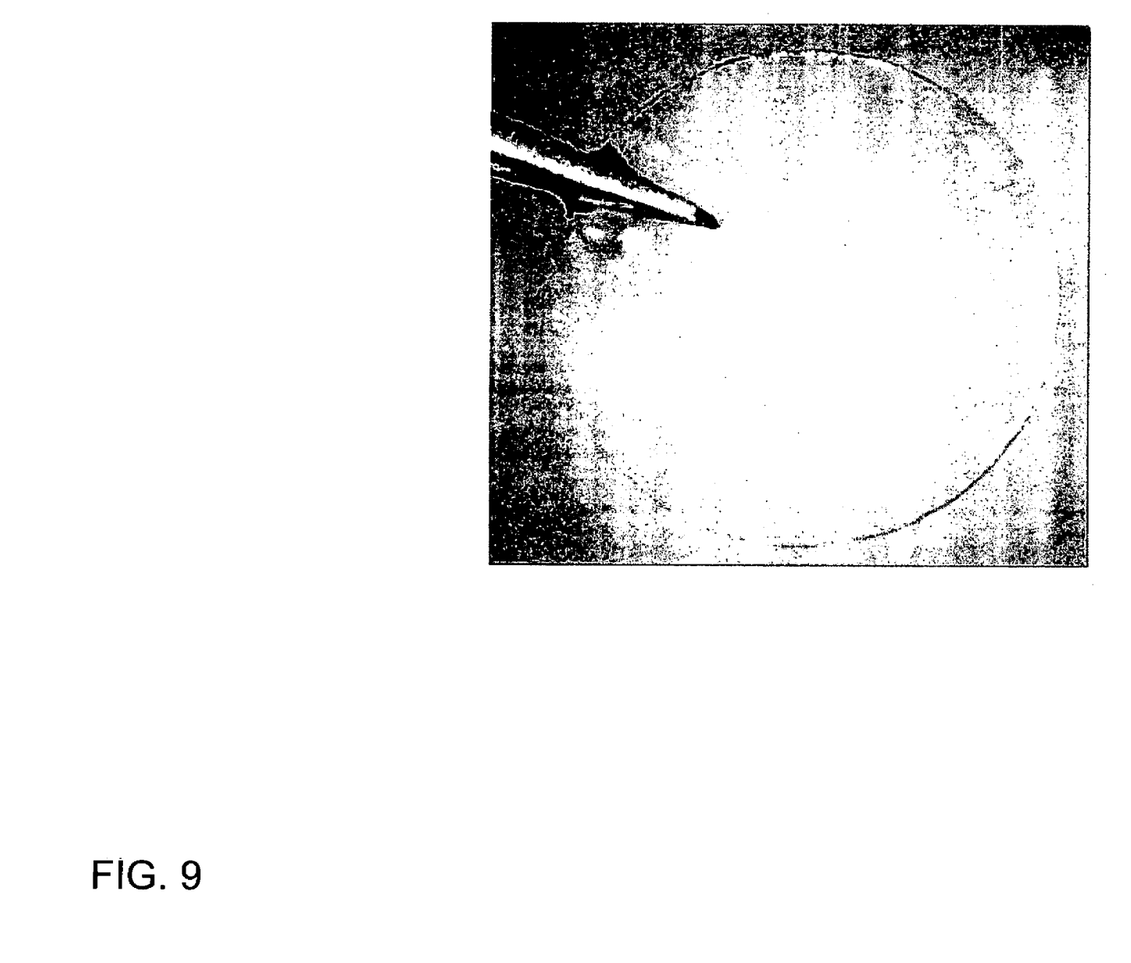
FIG. 9 shows a photograph of a hydrogel according to the present invention.

The percentage (%) of light transmittance of IPN hydrogels composed of PEG (50% w/v in $dH_2O$) in the preparation state of the first network and polyacrylic acid (50% v/v in $dH_2O$) at 550 nm was also measured using a Varian Cary 1E/Cary 3E UV-Vis spectrophotometer following the method described by Saito et al (Saito et al, "Preparation and Properties of Transparent Cellulose Hydrogels", Journal of Applied Polymer Science, Vol. 90, 3020-3025 (2003)). The refractive index of the PEG/PAA hydrogel (with PEG MW 8000) was measured using an Abbe Refractometer (Geneq, Inc., Montreal, Quebec). The percentage of light transmittance was found to be 90%, and the refractive index was found to be 1.35. Hydrogels according to the present invention, as well as contact lenses made from these hydrogels, are preferably at least about 70% transparent. An example of this hydrogel is shown in FIG. 9. This hydrogel had an equilibrium water content of 85% and a tensile strength of 1.1 MPa.

Protein Adsorption

Figure 10:
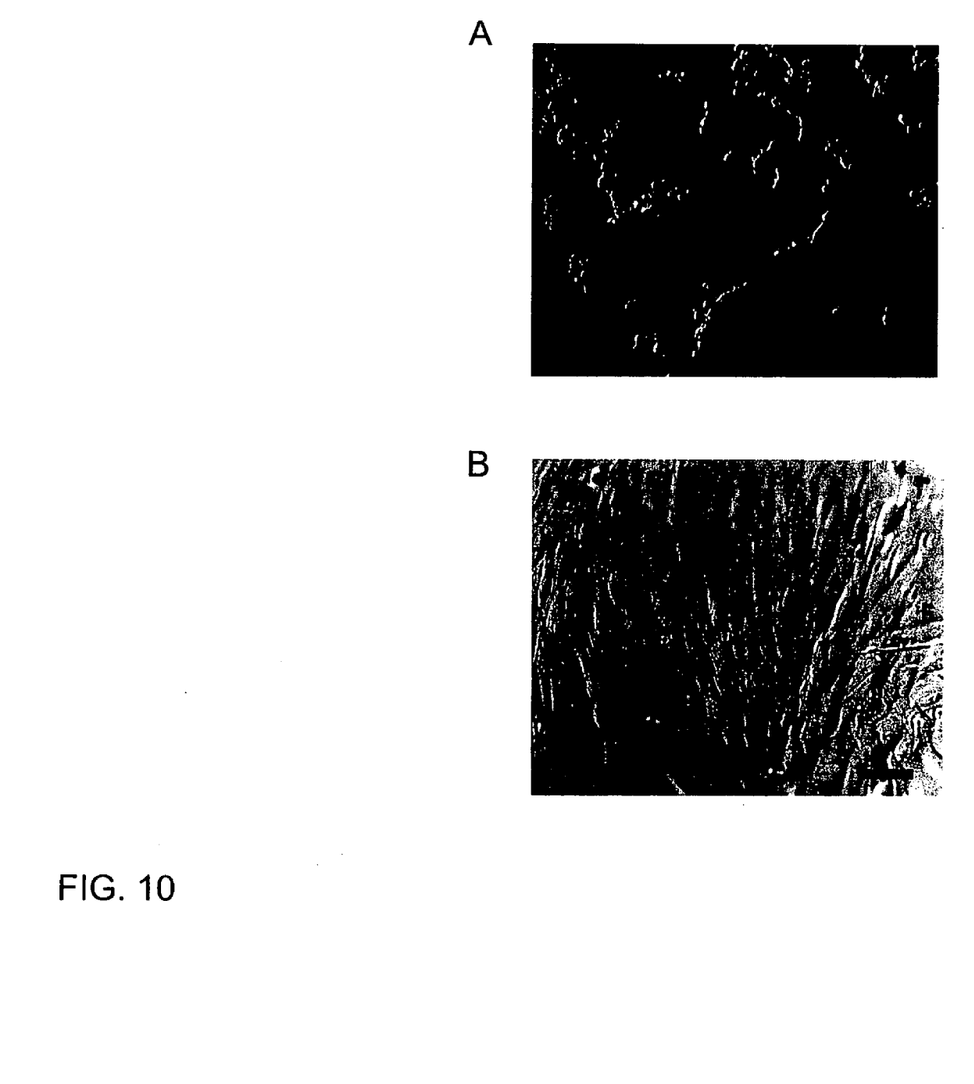
FIG. 10 shows resistance of an interpenetrating polymer network hydrogel to collagen type I adsorption according to the present invention as indicated by cell growth.

IPN hydrogels of the present invention have a high resistance to protein adsorption. This makes them especially well suited for use in extended wear contact lenses. To demonstrate this, primary rabbit corneal epithelial cells was cultured and seeded at a concentration of $1 \times 10^5$ cells/mL onto unmodified PEG/PAA hydrogels previously incubated in a 0.3% collagen type I solution and PEG/PAA hydrogels with photochemically bound collagen type I on its surface. Representative results from these experiments are shown in the photomicrographs in FIG. 10. FIG. 10A shows no cell attachment or spreading on an unmodified PEG/PAA hydrogel that was incubated in collagen type I. FIG. 10B, in contrast, shows excellent cell growth and spreading upon a PEG/PAA surface that was covalently modified with collagen type I. These results show that without chemical modification of the hydrogel surfaces, collagen type I does not adsorb and, as a consequence, epithelial cells will not grow on or adhere to the PEG/PAA IPNs.

Figure 11:
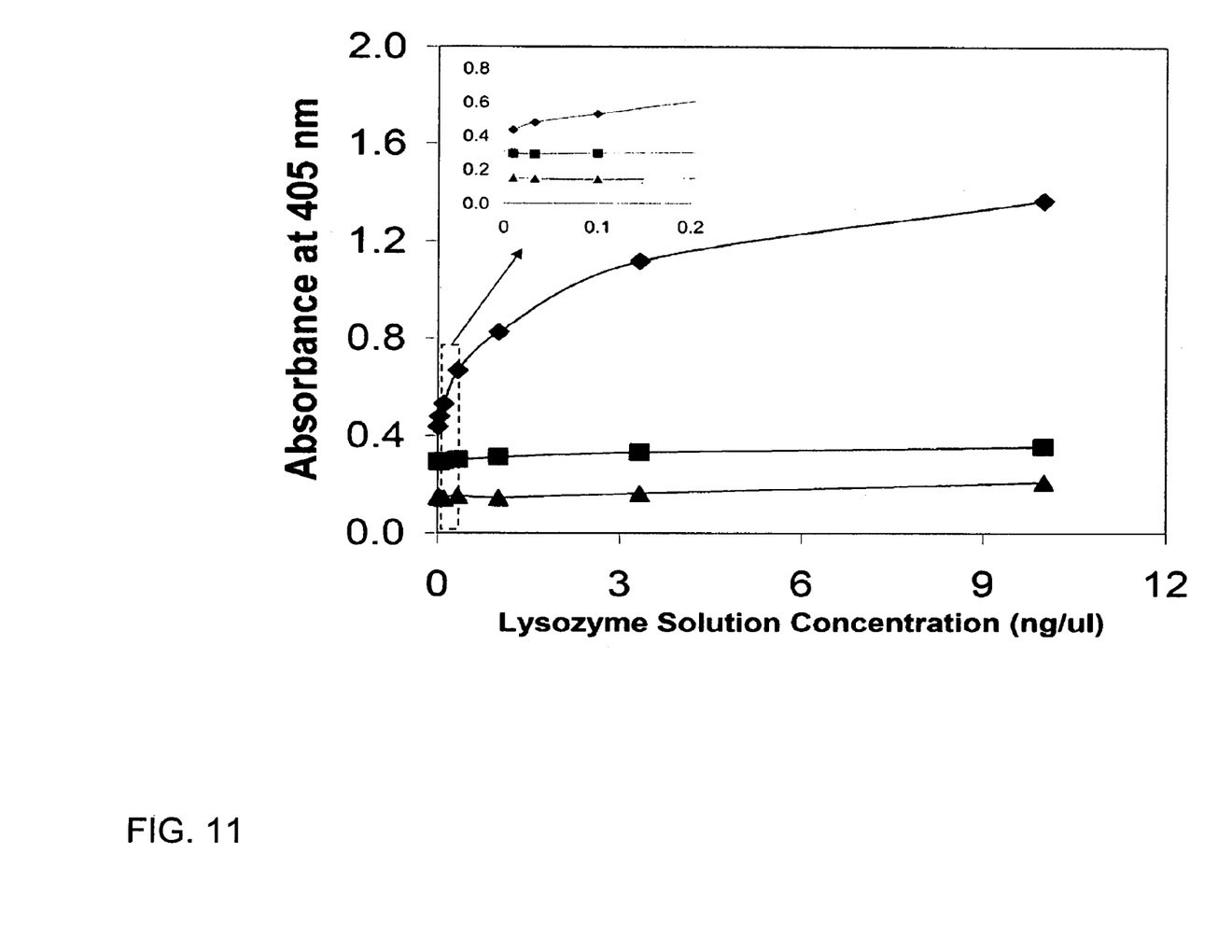
FIG. 11 shows resistance of an interpenetrating polymer network hydrogel according to the present invention to protein adsorption.

FIG. 11 shows results of an experiment in which MaxiSorp Polystyrene (indicated by diamonds), PEG/PAA IPN hydrogels (indicated by squares) and PHEMA (indicated by triangles) were incubated with varying concentrations of a lysozyme protein solution. Lysozyme is a protein present in the tear film, and is thus an important indicator of protein adsorption for contact lenses. After 1 hour at 37 degrees Celsius, the materials were washed with phosphate buffered saline (PBS) and incubated with a horse-radish-peroxidase-conjugated lysozyme primary antibody (1:4000 dilution) followed by incubation with an 2,2'-azino-bis(3-ethylbenzthiazoline-6-sulphonic acid) (ABTS) substrate. FIG. 9 shows that PEG/PAA hydrogels show an increased resistance to lysozyme adsorption when compared to MaxiSorp, and a similar level of lysozyme adsorption to PHEMA, which is a material used in current contact lenses. Although PHEMA exhibited a lower background absorption than did PEG/PAA, both PHEMA and PEG/PAA showed little change from the baseline absorption at 405 nm with increasing lysozyme concentration. Thus, PEG/PAA IPN hydrogels show a high resistance to protein adsorption, making them well suited for use as contact lenses As one of ordinary skill in the art will appreciate, various changes, substitutions, and alterations could be made or otherwise implemented without departing from the principles of the present invention. Accordingly, the scope of the invention should be determined by the following claims and their legal equivalents.

What is claimed is:

1. A contact lens, comprising: an interpenetrating network hydrogel with a first hydrophilic network interpenetrated with a second hydrophilic network, wherein said first hydrophilic network is an entangled network of self-linked hydrophilic telechelic macromonomers covalently bonded to themselves or other of said macromonomers in said first network, wherein each of said hydrophilic telechelic macromonomers is a poly(ethylene) glycol (PEG) diacrylate or poly(ethylene) glycol (PEG) dimethacrylate based telechelic macromonomer, and wherein said second network is a network of crosslinked poly(acrylic) acid.

2. The contact lens as set forth in claim 1, wherein said first network comprises at least about 50% of the reaction product of said telechelic macromonomer by dry weight.

3. The contact lens as set forth in claim 1, wherein said hydrophilic telechelic macromonomers have a molecular weight between about 575 Da and about 20,000 Da.

4. The contact lens as set forth in claim 1, wherein at least one surface of said interpenetrating polymer network hydrogel is surface modified.

5. The contact lens as set forth in claim 4, wherein said surface is modified with a layer of poly(ethylene) glycol (PEG) macromonomers, polymerized PEG macromonomers, polymerized PEG diacrylate, polymerized PEG dimethacrylate, polymerized PEG-acrylate or polymerized PEG-methacrylate.

6. The contact lens as set forth in claim 1, wherein said first network further comprises a hydrophilic monomer grafted onto said first network.

7. The contact lens as set forth in claim 6, wherein said hydrophilic monomer is acrylic acid, acrylamide, hydroxyethyl acrylamide, N-isopropylacrylamide, methacrylic acid, 2-acrylamido-2-methylpropanesulfonic acid, 2-hydroxyethyl methacrylate, 2-hydroxyethyl acrylate or derivatives thereof.

8. The contact lens as set forth in claim 1, wherein said second network further comprises a hydrophilic telechelic macromonomer grafted onto said second network.

9. The contact lens as set forth in claim 8, wherein said grafted hydrophilic telechelic macromonomer is PEG diacrylate or PEG dimethacrylate.

10. The contact lens as set forth in claim 1, wherein said interpenetrating network hydrogel has a tensile strength of at least about 1 MPa.

11. The contact lens as set forth in claim 1, wherein said interpenetrating network hydrogel has an oxygen permeability of at least about 15 Barrers.

12. The contact lens as set forth in claim 1, wherein said interpenetrating network hydrogel has an equilibrium water content of between about 70% and about 95%.

13. The contact lens as set forth in claim 1, wherein said interpenetrating network hydrogel is at least about 70% transparent.

14. The contact lens as set forth in claim 1, further comprising an additive for UV protection.

15. An interpenetrating polymer network hydrogel, comprising: a first hydrophilic network interpenetrated with a second hydrophilic network, wherein said first hydrophilic network is an entangled network of self-linked hydrophilic telechelic macromonomers covalently bonded to themselves or other of said macromonomers in said first network, wherein each of said hydrophilic telechelic macromonomers is a poly(ethylene) glycol (PEG) diacrylate or poly(ethylene) glycol (PEG) dimethacrylate based telechelic macromonomer, and wherein said second network is a network of crosslinked poly(acrylic) acid.

16. The interpenetrating polymer network hydrogel as set forth in claim 15, wherein said first network comprises at least about 50% of the reaction product of said telechelic macromonomer by dry weight.

17. The interpenetrating polymer network hydrogel as set forth in claim 15, wherein said hydrophilic telechelic macromonomer has a molecular weight between about 575 Da to about 20,000 Da.

18. The interpenetrating polymer network hydrogel as set forth in claim 15, wherein at least one surface of said interpenetrating polymer network hydrogel is surface modified.

19. The interpenetrating polymer network hydrogel as set forth in claim 18, wherein said surface is modified with a layer of poly(ethylene) glycol (PEG) macromonomers, polymerized PEG macromonomers, polymerized PEG diacrylate, or polymerized PEG dimethacrylate.

20. The interpenetrating polymer network hydrogel as set forth in claim 15, wherein said first network further comprises a hydrophilic monomer grafted onto said first network.

21. The interpenetrating polymer network hydrogel as set forth in claim 20, wherein said hydrophilic monomer is acrylic acid, acrylamide, hydroxyethyl acrylamide, N-isopropylacrylamide, methacrylic acid, 2-acrylamido-2-methylpropanesulfonic acid, 2-hydroxyethyl methacrylate, 2-hydroxyethyl acrylate or derivatives thereof.

22. The interpenetrating polymer network hydrogel as set forth in claim 15, wherein said second network further comprises a hydrophilic telechelic macromonomer grafted onto said second network.

23. The interpenetrating polymer network hydrogel as set forth in claim 22, wherein said grafted hydrophilic telechelic macromonomers are PEG diacrylate or PEG dimethacrylate.

24. The interpenetrating polymer network hydrogel as set forth in claim 15, wherein said interpenetrating network hydrogel has a tensile strength of at least about 1 MPa.

25. The interpenetrating polymer network hydrogel as set forth in claim 15, wherein said interpenetrating network hydrogel has an oxygen permeability of at least 15 Barrers.

26. The interpenetrating polymer network hydrogel as set forth in claim 15, wherein said interpenetrating network hydrogel has an equilibrium water content of between about 70% and about 95%.

27. The interpenetrating polymer network hydrogel as set forth in claim 15, wherein said interpenetrating network hydrogel is at least about 70% transparent.

28. The contact lens as set forth in claim 1, wherein the molar ratio between said first network and said second network is about 1:1 to about 1:5000.

29. The contact lens as set forth in claim 1, wherein the weight ratio between said first network and said second network is about 10:1 to about 1:10.

30. The interpenetrating polymer network hydrogel as set forth in claim 15, wherein the molar ratio between said first network and said second network is about 1:1 to about 1:5000.

31. The interpenetrating polymer network hydrogel as set forth in claim 15, wherein the weight ratio between said first network and said second network is about 10:1 to about 1:10.

* * * * *

UNITED STATES PATENT AND TRADEMARK OFFICE
CERTIFICATE OF CORRECTION

| | | |
|---|---|---|
| PATENT NO. | : 7,857,447 B2 | |
| APPLICATION NO. | : 11/636114 | |
| DATED | : December 28, 2010 | |
| INVENTOR(S) | : Myung et al. | |

It is certified that error appears in the above-identified patent and that said Letters Patent is hereby corrected as shown below:

On title page

In item (75) Inventors:

Jaan Noolandl should be Jaan Noolandi

Signed and Sealed this
Twelfth Day of July, 2011

David J. Kappos
*Director of the United States Patent and Trademark Office*